3,038,948
ALKYLATION PROCESS
Richard F. Trow, Port Arthur, Tex., assignor to Texaco Inc., New York, N.Y., a corporation of Delaware
Filed Dec. 7, 1959, Ser. No. 857,702
2 Claims. (Cl. 260—683.45)

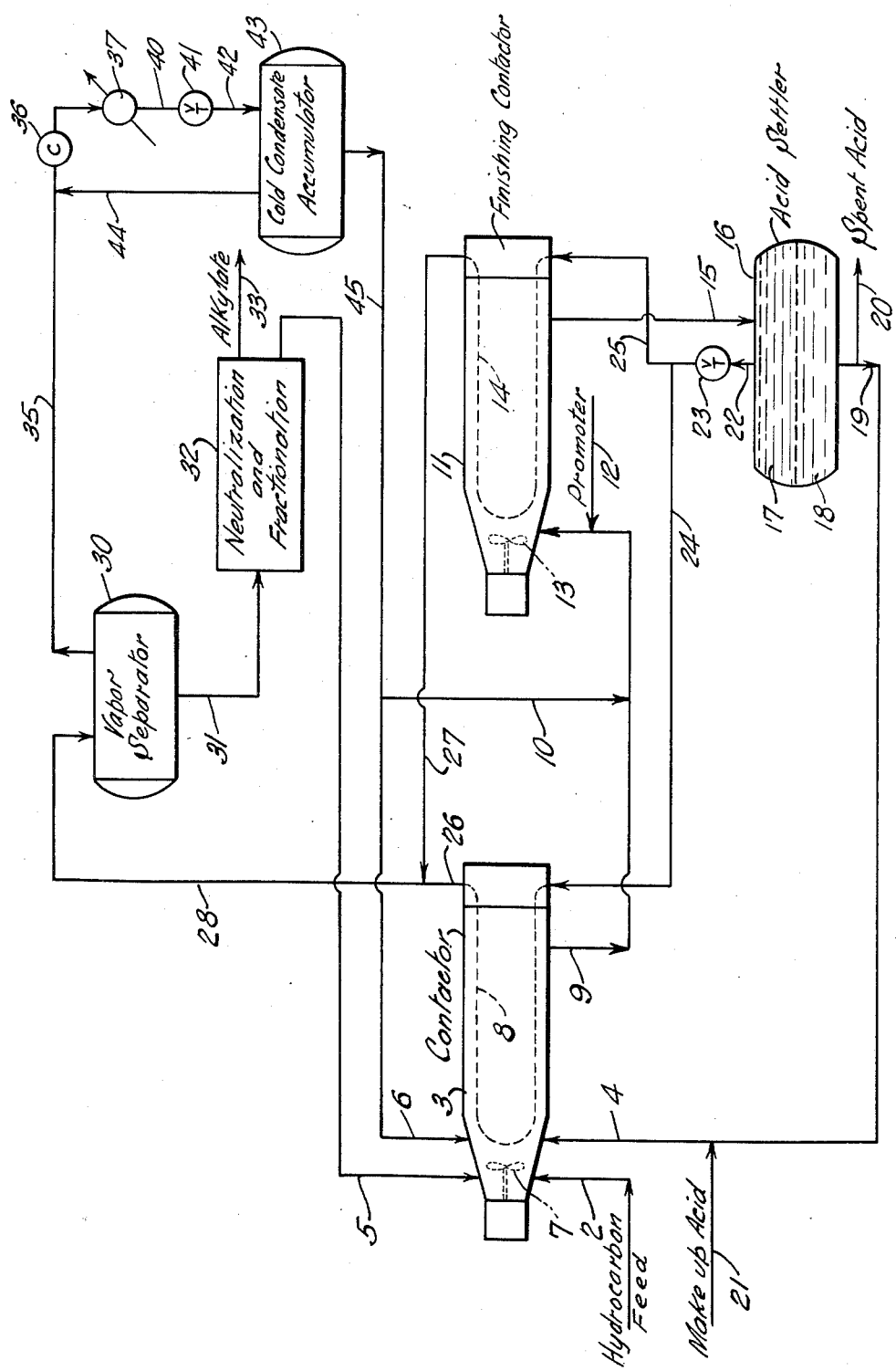

This invention is directed to a method of reacting olefin-based alkylatable material and isoparaffin in the presence of an alkylation catalyst and more particularly to such an alkylation process employing at least two reaction zones, the last of which is operated as a clean-up reaction zone and said clean-up reaction zone is operated at a temperature lower than a preceding reaction zone.

Alkylation of olefinic materials with isoparaffins is employed extensively for the production of high octane number fuels. The alkylation reaction is effected in the liquid phase in the presence of a liquid catalyst. The alkylation reaction is directed to the production of a maximum yield of high product quality alkylate with minimum catalyst consumption by maintaining desirable operating conditions including conditions of intimate mixing, a low temperature, and a high ratio of isoparaffin to olefin. Intimate contact of the reactants and catalyst is effected by intensive mixing forming an emulsion of liquid hydrocarbon and catalyst. The alkylation reaction temperature is desirably maintained within a range of about 35 to 75° F. It is necessary to refrigerate the reactants and reaction mixture to maintain a desirable reaction temperature since a large amount of heat is liberated as the heat of reaction of the olefin and isoparaffin. Mixing is typically obtained by rapid circulation of the reaction mixture by means of pumps as in pump and tank systems or by means of impellers or jets in internal circulating systems. Refrigeration may be provided by autorefrigeration, effluent refrigeration or external refrigeration as is well known in the art. In all of these systems, an emulsion of the reaction mixture is formed and circulated in the reaction zone. Reactant hydrocarbons and catalyst are continuously added to the reaction mixture, and a portion of the emulsion is continuously withdrawn. The emulsion which is withdrawn is separated into catalyst and hydrocarbon phases; the catalyst phase is recycled and alkylate product is recovered from the hydrocarbon phase.

In the catalytic alkylation of olefins with isoparaffins, a preponderance of isoparaffin (typically about 60 to 80 volume percent or more of the hydrocarbons in the reaction mixture) over olefin material and hydrocarbon diluents is used to direct the reaction towards production of the most valuable aviation or automotive fuels. Consequently a large quantity of isoparaffin must be recovered and recycled for reuse in the process. Isobutane is generally used as the isoparaffin for the manufacture of aviation or motor fuels although other isoparaffins, for example isopentane, may be employed.

The alkylatable material reacted with isoparaffin is olefin-based, that is, it is an olefin for example, propylene, butylene, pentylene or the like, a low boiling polymer of a normally gaseous olefin, or an alkyl ester for example, an alkyl sulfate or fluoride which may be produced by absorption of an olefin in acid catalyst in the so-called two-stage alkylation process or by other means.

In catalytic alkylation, the mol ratio of isoparaffin to olefin-based material supplied to the alkylation zone is maintained substantially in excess of 1 to 1, and preferably within the range of about 4 to 1 to about 20 to 1. The catalyst to liquid hydrocarbon volume ratio is maintained within the range of about 0.5 to 1 to about 5 to 1 and preferably within the range of about 1 to 1 to about 3 to 1. Catalyst strength is maintained of at least about 88 percent acid strength when sulfuric acid is used, of at least about 85 percent titratable acidity when hydrogen fluoride is used or of at least 15 weight percent aluminum chloride (expressed as equivalent aluminum) when aluminum chloride-hydrocarbon complex liquid catalyst is used. A liquid catalyst which is non-volatile under alkylation reaction conditions, for example, sulfuric acid, is preferred. Sulfuric acid strength is maintained within the range of about 88 to 95 percent by purging spent acid from the system and by adding make-up acid of about 98.0 to 99.9 percent purity.

An important part of the isobutane employed in alkylation processing is a recycle stream produced by fractional distillation of alkylation products in a deisobutanizing fractional distillation zone, the isobutane being recovered as a distillate fraction of high isobutane concentration, for example, about 85 to 95 liquid volume percent isobutane. The alkylate in such distillation zone is recovered in the liquid bottoms fraction. This liquid bottoms fraction may be fractionated in conventional manner to separate light ends and alkylate fractions for use as fuel blending stocks. In the usual deisobutanizing fractional distillation operation, isobutane distillate is returned to the top of the distilling column as reflux at a high reflux ratio, for example 4 to 1, to maintain high isobutane purity in the distillate.

In the alkylation reaction, it is postulated that the olefinic material reacts with the catalyst forming an acid ester as an intermediate product and that this intermediate product then reacts with isoparaffin releasing the catalyst and forming alkylate. Although the alkylation reaction is rapid and proceeds substantially to completion in reaction systems wherein reactants are continuously added to circulating emulsion, the acid ester intermediate product is present in the catalyst phase of the emulsion. As a result, a part of the olefin feed, for example, up to about 10 percent of the olefin feed, may appear as the acid ester intermediate product in the emulsion phase which is withdrawn from the reaction zone in prior art processes. If emulsion containing intermediate products is passed directly to a settling zone, these intermediate products tend to react further with the catalyst by conjunct polymerization effecting degradation of the catalyst and the formation of hydrocarbons of poor fuel quality since the hydrocarbon fraction rich in isobutane is no longer in intimate contact with the bulk of the acid containing the intermediate products after coalescence of the acid in the settler. This undesirable reaction in the settler is evidenced by a temperature rise which may be as much as 10° F. These intermediate products may be converted to alkylate by contact with isoparaffin in a supplemental finishing or clean-up reaction zone to which emulsion is passed in the absence of additional olefin feed stock. In this way, the formation of alkyl acid esters is stopped and the continued reaction of the ester with the isoparaffin substantially reduces the ester content of the emulsion discharged from the finishing reactor.

In occordance with the alkylation process of this invention, at least two reaction zones are operated in series flow with the terminal reaction zone operated as a finishing or clean-up reaction zone at a lower temperature than the initial reaction zone. Advantageously the primary reaction zone is operated at a temperature within the range of about 45 to 75° F. and the finishing reaction zone is operated at a temperature within the range of about 15 to 55° F. The emulsion is discharged directly from the finishing reactor to the settling zone whereby the settling zone assumes the low temperature of the finishing zone. The emulsion is then separated into catalyst and hydrocarbon layers under conditions suppressing undesirable polymerization and acid degradation reactions. Conversely, with the finishing reactor and catalyst separator operated at a desirably low temperature for example, about 20 to 35° F., the initial alkylation reaction zone may be operated at a slightly elevated temperature for example, 60 to 75° F. thus effecting relatively rapid and complete reaction therein without encountering undesirable side reactions or catalyst degradation reactions in the separator since the emulsion is cooled in the finishing reactor before discharge to the quiescent settling zone.

Advantageously, the temperature of the finishing zone is reduced by introducing cold isobutane thereinto. The cold isobutane stream may be admixed with the emulsion stream before introduction into the finishing reactor or the emulsion and cold isobutane streams may be combined in the finishing reactor.

The initial reaction zone and finishing reaction zone may be refrigerated by an effluent refrigeration system wherein the hydrocarbon liquid product effluent from the finishing zone is flashed effecting vaporization of a part of the hydrocarbon and concomitant chilling of the resulting liquid and vapor. The chilled liquid or the chilled liquid-vapor mixture is passed through cooling coils in indirect heat exchange with the contents of the alkylation reaction zones where additional vaporization occurs as a result of the absorption of heat. The vapor produced in the flashing and heat exchange zones consists essentially of low boiling components of the reaction mixture; for example, the vapor may comprise about 80.0 percent isobutane with small amounts of propane and normal butane and only traces of heavier hydrocarbons including alkylate. This vapor is condensed forming an isobutane rich condensate. The condensate may be chilled to a temperature of about 0 to 35° F. preferably about 15 to 30° F. by autorefrigeration and the chilled condensate employed as the cold isobutane stream passed to the finishing reactor.

In cooling the finishing reaction zone by the introduction of chilled condensate, not only is a desirable reduction in temperature achieved but the proportion of isobutane in the reaction mixture in the finishing zone is increased. This increase of isobutane in the reaction mixture assists in effecting complete conversion of alkyl ester intermediate products to alkylate.

An advantage of the process of this invention is that intermediate reaction products produced in the alkylation of olefin-based materials with isoparaffins are efficiently converted to high quality alkylate.

Another advantage of this invention is that catalyst degradation resulting from reaction of intermediate products in the catalyst separator is avoided.

The accompanying drawing diagrammatically illustrates the process of this invention. Although the drawing illustrates one arrangement of apparatus in which the process of this invention may be practiced, it is not intended to limit the invention to the particular apparatus or material described.

Referring to the drawing a hydrocarbon feed comprising olefinic and paraffinic hydrocarbons, for example, a propylene-butylene fraction from catalytic cracking is introduced through line 2 into contactor 3. Catalyst, for example, sulfuric acid in line 4 and isobutane recycle stream in line 5 are also passed to contactor 3. The contents of contactor 3 are circulated rapidly by an impeller 7 effecting formation of an emulsion of hydrocarbons and catalyst. The emulsion circulated in contactor 3 is cooled by heat exchange coil 8 maintaining a desired reaction temperature, for example about 60° F. A portion of the circulating emulsion is withdrawn through line 9, admixed with chilled condensate from line 10 and the mixture is discharged at a temperature of about 45° F. to finishing contactor 11. If desired in alkylating feed containing substantial amounts of propylene, an alkylation promoter may be admixed with the feed to the finishing contactor as indicated by line 12.

Finishing contactor 11 is provided with impeller 13 to maintain intimate mixing of the contents and cooling coil 14 to maintain the reaction temperature at a desired level, for example, the temperature of the feed emulsion mixture. Incompletely reacted olefin, for example, alkyl acid ester present in the acid phase of the emulsion, reacts with isoparaffin to form alkylate. Effluent from finishing contactor 11 is discharged through line 15 to settler 16. Settler 16 is a quiescent zone wherein hydrocarbon and acid catalyst phases separate, the lighter hydrocarbon phase rising to the top as indicated by numeral 17 and the heavier acid catalyst phase settling to the bottom as indicated by numeral 18. Acid catalyst is withdrawn through line 19 and recirculated to the contactor 3 through line 4. Spent acid is withdrawn through line 20 and make-up acid is added through line 21 to maintain the concentration of the acid in the system at a desired level.

Hydrocarbon liquid is withdrawn from settler 16 through line 22 and passed through throttle valve 23 wherein the pressure is reduced effecting concomitant vaporization of a part of the hydrocarbon and chilling of the resultant liquid-vapor mixture. The chilled liquid-vapor mixture is discharged through lines 24 and 25 to cooling coils 8 and 14 respectively to provide refrigeration and absorption of the heat liberated in the respective contactors. Effluent from cooling coil 8 is discharged through line 26, combined with the effluent from cooling coil 14 in line 27 and the mixture is discharged through line 28 to vapor separator 30. Liquid separated in separator 30, comprising product alkylate and unreacted isoparaffin, is withdrawn through line 31 to neutralization and fractionation facility 32. Alkylate is discharged through line 33 for use as high octane motor or aviation fuel. Recovered isobutane from neutralization and fractionation facility 32 is recycled through line 5 to contactor 3.

Vapor from separator 30 consisting substantially of isobutane is withdrawn through line 35 and is condensed by means of compressor 36 and cooler 37. Condensate from cooler 37 is passed through line 40 and throttle valve 41 effecting partial vaporization and chilling of remaining condensate and vapor. The chilled liquid-vapor mixture is passed through line 42 to condensate accumulator 43. Vapor from accumulator 43 is withdrawn through line 44 and recycled through line 35 and compressor 36. Chilled condensate is withdrawn through line 45 to supply the chilled condensate passed through lines 10 and 9 to finishing contactor 11. Chilled condensate in excess of the amount needed to cool the feed to finishing contactor 11 is passed through line 6 to supply additional isoparaffin to the reaction mixture in contactor 3.

*Example I*

In accordance with the process of this invention, a mixed olefin feed stock is alkylated with isobutane in the presence of a sulfuric acid catalyst. The olefinic portion of the feed comprises 70.0 percent propylene and 30.0 percent butylenes. (All compositions are given in mol percent.) The reaction is effected in contactors provided with impellers for intimate mixing and circulation of the reactants and catalyst and with internal refrigeration coils for removal of the heat of reaction and control of the reaction temperatures. In this test, the contactors are arranged in pairs, the first of each pair functioning as a primary alkylation zone and the second as a "clean up" or finishing zone. Olefin, isobutane and acid catalyst are introduced into the primary contactor which is operated at a temperature of 69° F. Emulsion is withdrawn from the primary contactor, admixed with condensate from effluent refrigeration vapors comprising about 80 percent isobutane at a temperature of 20° F., and introduced into the finishing contactor operated at 43° F. Emulsion withdrawn from the finishing reactor is passed to an acid settler wherein acid and hydrocarbon phases are separated. Acid phase withdrawn from the settler is at a temperature of 43 to 44° F. The temperature rise of 0 to 1° F. in the settler is evidence that substantially complete conversion of intermediate products to alkylate is effected in the finishing contactor and that no significant amount of reaction occurs in the settler. ASTM distillation of the debutanized total alkylate shows 50 percent recovered at 214° F., 90 percent at 326° F. and an end point of 413° F. The debutanized total alkylate is rerun producing a yield of 93.7 volume percent of light alkylate suitable for use in aviation gasoline.

*Example II*

In comparison with the foregoing test, a similar feed stock is processed in the same equipment with the contactors operated individually and at about the same temperature as the finishing contactor employed in the above described Example I. In this test, the olefinic portion of the feed comprises 68.3 percent propylene and 31.7 percent butylenes. The olefin, isobutane and acid are contacted at a temperature of 46° F. Effluent from the contactor is passed directly to a settling zone from which hydrocarbon and acid phases are separated. The temperature of the acid withdrawn from the settling zone is 52° F. The temperature difference between the contactor effluent (46° F.) and the settler effluent (52° F.) indicates that appreciable reaction occurs in the settling zone. ASTM distillation of the debutanized total alkylate shows 50 percent recovered at 220° F., 90 percent at 355 and an end point of 443° F. The debutanized total alkylate is rerun producing a yield of 88.0 percent of light alkylate suitable for use in aviation gasoline.

In comparing the results of Example I and Example II, it will be noted that in Example I, the temperature rise in the settler is 0 to 1° F. indicating little if any reaction therein whereas in Example II a temperature rise of 6° F. indicates appreciable reaction although the temperature of the emulsion passed to the settler was about the same in the two cases. In comparing the distillation data, it is seen that the total alkylate in Example I contains less heavy ends and is rerun to produce a higher yield of aviation alkylate as compared with the total alkylate of Example II.

Obviously many modifications and variations of the invention as hereinbefore set forth may be made without departing from the spirit and scope thereof and only such limitations should be imposed as are indicated in the appended claims.

I claim:

1. In an alkylation process wherein an olefin-based alkylatable material and isoparaffin are reacted in the presence of an alkylation catalyst in a first reaction zone under alkylation conditions, at least a part of the effluent from said first reaction zone is passed to a second reaction zone in the absence of an additional amount of said olefin-based alkylatable material, alkyl acid reaction products of said olefin-based alkylatable material in said catalyst in the effluent from said first reaction zone are reacted with isobutane in said second reaction zone under alkylation conditions with the formation of alkylate and released catalyst, effluent from said second reaction zone is passed to a separating zone, and said first reaction zone is refrigerated with at least a part of a mixture of reactants and reaction products by evaporation of low boiling hydrocarbon components thereof, the improvement which comprises condensing said evaporated components forming a cold condensate having a temperature below about 35° F., admixing said cold condensate with said effluent from said first reaction zone and passing said mixture of cold condensate and effluent from said first reaction zone to said second reaction zone at a temperature within the range of 15 to 55° F.

2. In an alkylation process wherein an olefin-based alkylatable material and isoparaffin are reacted in the presence of an alkylation catalyst in a first reaction zone under alkylating conditions, and at least a part of the effluent from said first reaction zone is passed to a second reaction zone in the absence of an additional amount of said olefin-based alkylatable material, alkyl acid reaction products of said olefin-based alkylatable material in said catalyst in the effluent from said first reaction zone are reacted with isobutane in said second reaction zone under alkylation conditions with the formation of alkylate and released catalyst, the improvement which comprises passing effluent from said second reaction zone to a separating zone, separating hydrocarbon and catalyst phases in said separation zone, passing at least a part of said catalyst phase to said first reaction zone, flashing at least a part of said hydrocarbon phase effecting vaporization of a part of said hydrocarbon and chilling of resultant vapor and liquid hydrocarbon, passing at least a part of said chilled hydrocarbon liquid in indirect heat exchange with the reactants of said first reaction zone vaporizing a part of said chilled hydrocarbon liquid, condensing said vaporized hydrocarbons forming a cold condensate having a temperature below about 35° F., admixing at least a part of said cold condensate with said effluent from said first reaction zone, passing said mixture of cold condensate and effluent from said first reaction zone at a temperature within the range of 15 to 55° F. to said second reaction zone, and maintaining said second reaction zone at alkylation conditions including a temperature lower than the temperature of said first reaction zone and within the range of 15 to 55° F.

References Cited in the file of this patent
UNITED STATES PATENTS

| | | |
|---|---|---|
| 2,245,038 | Holm et al. | June 10, 1941 |
| 2,322,482 | Stahly et al. | June 22, 1943 |
| 2,392,962 | Abrams et al. | Jan. 15, 1946 |
| 2,618,669 | Mrstik | Nov. 18, 1952 |